July 5, 1960

E. H. HARTEL 2,943,867

STEERING DISCONNECT FOR AIRCRAFT

Filed July 29, 1957

INVENTOR.
ERWIN H. HARTEL
BY

ATTORNEY

July 5, 1960 E. H. HARTEL 2,943,867
STEERING DISCONNECT FOR AIRCRAFT
Filed July 29, 1957 2 Sheets-Sheet 2

INVENTOR.
ERWIN H. HARTEL
BY
ATTORNEY

United States Patent Office 2,943,867
Patented July 5, 1960

2,943,867
STEERING DISCONNECT FOR AIRCRAFT
Erwin H. Hartel, Cleveland, Ohio, assignor to The Cleveland Pneumatic Industries Inc., Cleveland, Ohio, a corporation of Ohio Filed July 29, 1957, Ser. No. 674,858
1 Claim. (Cl. 280—442)

This invention relates generally to landing gears and more particularly to a lock mechanism to which a tow-bar can be attached when the aircraft is to be towed on the ground wherein the connection of the tow-bar automatically disconnects the steering linkage so that the wheel is free to be swiveled through a full 360° by the tow-bar.

When an aircraft is moved on the ground in confined places it is customary to use a towing tractor or the like which is connected to the nose landing gear of the aircraft by a tow-bar arranged to turn the nose wheel and pull the aircraft so that the aircraft will follow the tractor. In the past the steering linkage has been manually disconnected when the tow-bar is connected to the aircraft so that the nose wheel can be freely swiveled by the tow-bar. This has not only required that the ground handling personnel perform a separate operation, but in addition has resulted in damage if the ground handling personnel neglect to disconnect the steering linkage before towing or re-connect it after towing.

It is an important object of this invention to provide a landing gear with means which automatically permit free swiveling of the landing wheel when the tow-bar is connected for ground handling.

It is another important object of this invention to provide lock means for an aircraft landing gear which automatically releases to permit free swiveling of the landing wheel when a tow-bar is connected thereto.

It is still another object of this invention to provide a landing gear having power steering in combination with lock means adapted to automatically disconnect the steering when a tow-bar is connected to the landing gear.

It is still another object of this invention to provide an aircraft landing gear incorporating lock means which automatically move to a locked position when the landing wheels move into proper orientation with the steering mechanism, and which is maintained in an unlocked position when a tow-bar is connected to the landing gear.

Further objects and advantages will appear from the following description and drawings, wherein.

In normal practice the nose landing gear is the only one that is steerable so the discussion that follows refers only to the nose landing gear, but it should be understood that if for some reason the landing gears other than the nose gear are to be swiveled in any particular application, the mechanism according to this invention could be applied equally well to any such landing gears.

Figure 1:
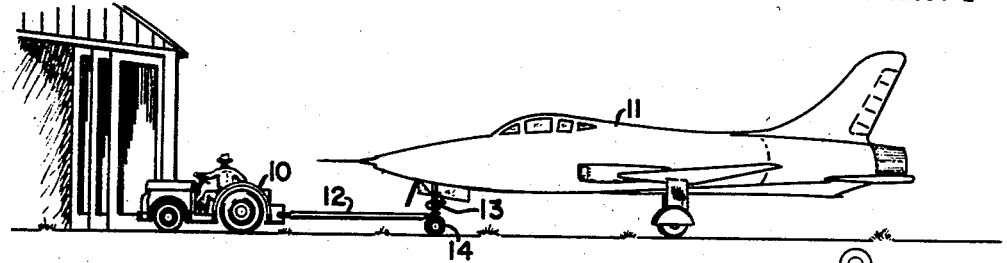
Figure 1 is a pictorial view illustrating how an aircraft is towed on the ground with a ground handling tractor.
Figure 2:
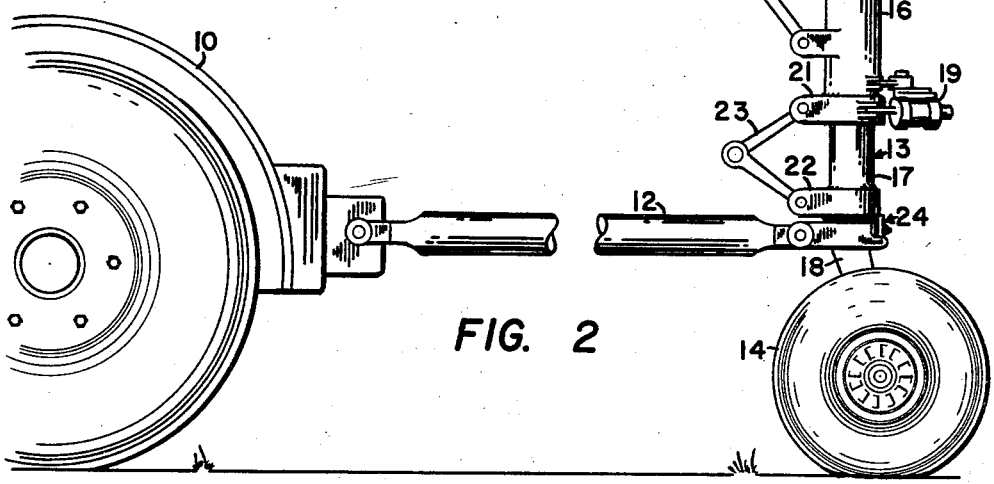
Figure 2 is an enlarged side elevation of a nose landing gear incorporating this invention with a tow-bar connected thereto.

Referring to the drawings, Figure 1 illustrates the normal method of towing an aircraft wherein a ground handling tractor 10 is connected to an aircraft 11 by a tow-bar 12. The aircraft 11 is provided with a nose landing gear 13 on which is mounted a landing wheel 14. The tow-bar 12 is connected to the nose landing gear 13 and is used to move the aircraft on the ground and also turn the landing wheel 14 so that the aircraft 11 will track or follow the tractor 10. A typical landing gear 13 includes an upper telescoping member 16 adapted to be mounted on the frame of the aircraft and a lower telescoping member 17 which is axially movable relative to the upper telescoping member 16. In normal practice fluid spring and shock absorber means are incorporated into the telescoping members 16 and 17 to resiliently urge the lower telescoping member 17 toward the extended position so that the weight of the aircraft can be resiliently supported on the landing gear.

A wheel support member 18 on which the wheel 14 is journaled is in turn mounted on the lower end of the lower telescoping member 17. In the embodiment shown turning of wheel 14 for steering is accomplished by a power steering mechanism including a fluid motor 19 connected between the upper telescoping member 16 and a steering collar 21 which is journaled on the lower end portion of the member 16. The steering collar 21 is in turn connected to the lower collar 22 by conventional torque arms 23. The torque arms 23 prevent relative rotation between the two collars 21 and 22 while permitting axial motion therebetween. Therefore, it is possible to axially fix the steering collar 21 on the upper telescoping member 16 and axially fix the lower collar 22 on the lower telescoping member 17. The lower collar 22 is journaled on the lower telescoping member 17, and is arranged so that it can either be rotationally locked on the member 17 for normal operation of the aircraft, or made free to rotate relative thereto for ground handling.

In normal power steering of the aircraft when the aircraft is operating under its own power, the fluid motor 19 is used to turn the steering collar 21 relative to the upper telescoping member 16 and in turn rotate the lower steering collar 22 through the torque arm connection. A lock mechanism 24 normally prevents relative rotation between the lower member 17, the wheel support 18 and the lower collar 22, so rotation of the latter produces rotation of the former and in turn steers the landing wheel 14. The lock mechanism 24 is operable to an unlocked position at which time the wheel support and landing wheel 14 are free to rotate relative to the lower collar 22 so that the landing wheel 14 can be freely swiveled.

Figure 3:
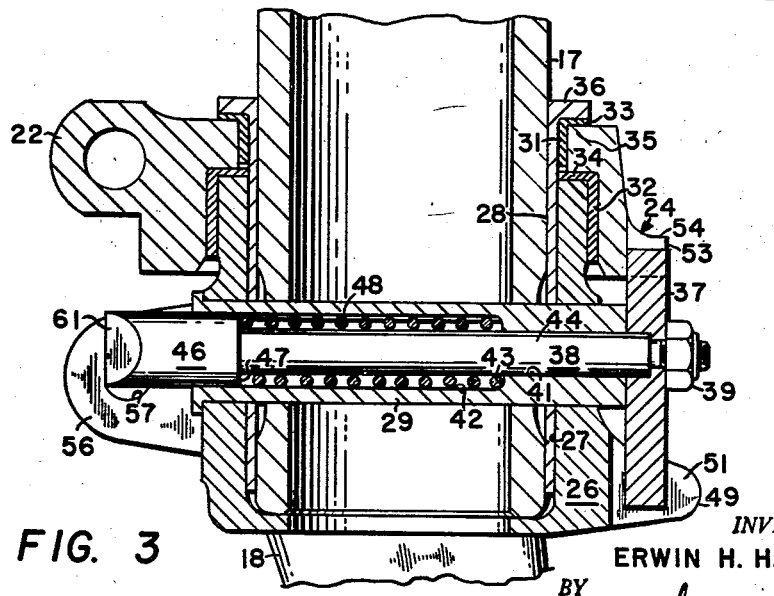
Figure 3 is an enlarged side elevation in longitudinal section of the preferred lock mechanism.
Figure 4:
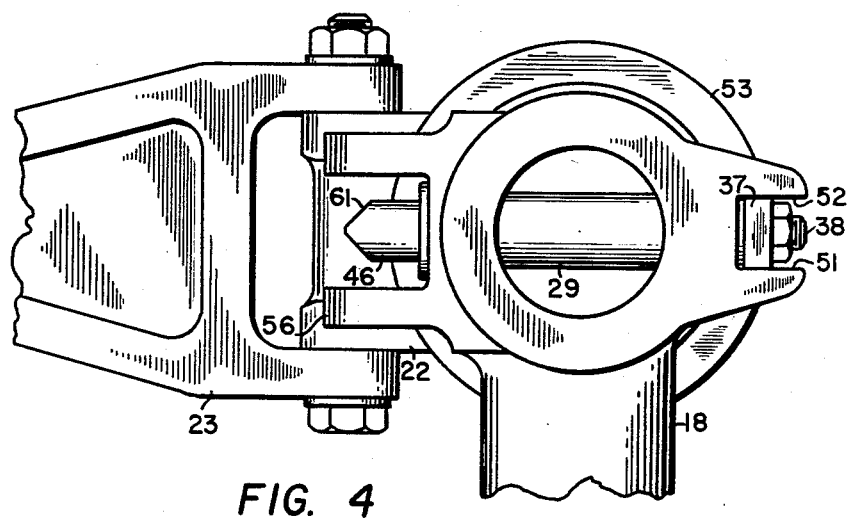
Figure 4 is a bottom view of the lock mechanism shown in the normal locked or flight position.
Figure 5:
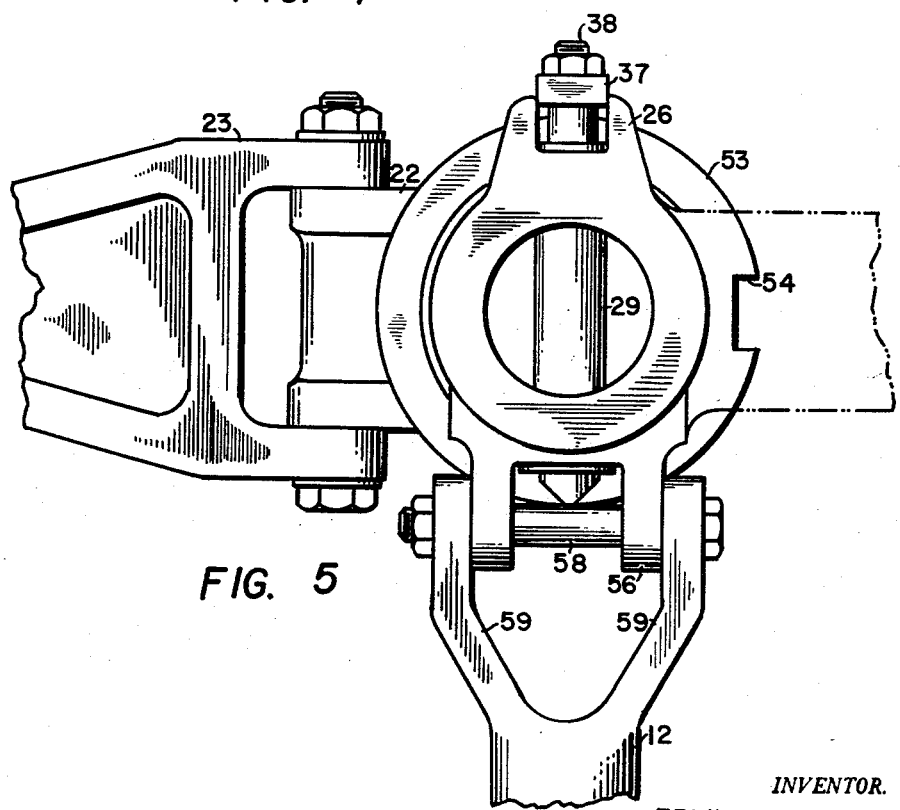
Figure 5 is a view similar to Figure 4 showing the position the elements assumed when a tow-bar is connected and the lock mechanism is in the unlocked position.

Reference should now be made to Figures 3 through 5 for detailed description of the lock mechanism 24. The wheel support 18 is provided with a mounting sleeve 26 formed with a central bore 27 into which the lower end of the lower telescoping member 17 projects. A bearing 28 may be positioned between the mounting sleeve 26 and the lower telescoping member 17 to prevent relative movement therebetween. In order to prevent relative rotation between the mounting sleeve 26 and the lower telescoping member 17, I provide a hollow pin 29 which extends laterally through the mounting sleeve 26 and the lower telescoping member 17. Those skilled in the art will recognize that this structure in effect makes the lower telescoping member 17, the mounting sleeve 26 and the wheel support 18 a unitary member so that the lower telescoping member 17 will rotate with the wheel 14 when the wheel is turned for steering purposes.

The lower collar 22 is journaled on bearings 31 and 32 and is formed with an inwardly extending flange portion 35 which projects between radially extending bearing portions 33 and 34. The bearing 28 is formed with a flange 36 which prevents upward movement of the bearing 31 and downward movement of the bearing 32 is prevented by the upper end of the mounting sleeve 26 so the lower collar 22 is axially fixed on, but rotatably carried by, the lower telescoping member 17.

In order to provide the locking between the lower collar 22 and the mounting sleeve 26 I provided a lock bar 37 secured to a sliding stem 38 by a nut fastener 39. The pin 29 is formed with a first axial bore 41 and a second larger co-axial bore 42 joined by a shoulder 43. The stem 38 is formed with a first portion 44 having a diameter adapted to closely fit the bore 41 and a second portion 46 which closely fits the bore 42. The first and second portions 44 and 46 are joined by a shoulder 47 and a spring 48 extends between the two shoulders 43 and 47 resiliently biasing the stem 38 and lock bar 37 toward the locked position shown in Figure 3. The mounting sleeve 26 is formed with a pair of spaced lugs 49 which provide opposed guide surfaces 51 and 52 between which the lower end of the lock bar 37 is positioned. The lock bar 37 is therefore, restrained against rotation about the central axis of the stem 38 but is movable along the axis of the stem 38 against the action of the spring 48. The lower sleeve 22 is formed with a peripheral cylindrical surface 53 and a notch 54 (best shown in Figure 5) which is adapted to receive the lock bar 37 when the mounting sleeve 26 and the lower collar 22 are properly oriented.

In the locked position, the lock bar 37 is positioned within the notch 54 so relative rotation between the lower collar 22 and the mounting sleeve 26 is prevented. If, however, the stem 38 and the lock bar 37 are moved to the right so that the upper end of the lock bar 37 clears the notch 54, the mounting sleeve 26 is free to rotate relative to the lower collar 22. In order to provide movement of the stem 38 to the unlocked position it is merely necessary to overcome the force of the spring 48.

The mounting sleeve 26 is formed with a pair of parallel tow lugs 56 with one on either side of the portion 46 of the stem 38. The tow lugs 56 are formed with co-axial bores 57 adapted to receive a tow-bar bolt 58 (shown in Figure 5) which is used to connect the tow-bar 12 to the nose gear 13. The tow-bar 12 is provided with a forked end having laterally spaced ears 59 adapted to fit over the tow lugs 56 and be pivotally connected thereto by the tow bolt 58. The stem 38 is proportioned so that the portion 46 normally projects between the lugs 56 when the lock bar 37 is in the locked position. In order to insert the tow-bar bolt 58 through the lugs 56, it is necessary to move the stem 38 inwardly a predetermined extent calculated to move the lock bar 37 out of the notch 54, or in an unlocked position. To facilitate the movement of the stem 38 to the unlocked position the end of the portion 46 is formed with opposed camming surfaces 61 so that the insertion of the tow-bar bolt 58 through the lugs 56 automatically moves the lock stem 38 to the unlocked position.

Those skilled in the art will recognize that by using the above described structure the lock mechanism 24 is automatically unlocked for swiveling motion anytime the tow-bar 12 is connected to the landing gear. Therefore the mounting sleeve 26 is free to rotate relative to the lower collar 22 when the tow-bar is connected to enable towing of the aircraft without danger of injury to the landing gear on its steering mechanism. As soon as the tow-bar 12 is disconnected by removing the tow-bar bolt 58 the action of the spring 48 urges the stem 28 lock bar 37 toward the lock position. If the mounting sleeve 26 is not properly oriented relative to the lower collar 22 at the time the tow-bar is disconnected the lock bar 37 will engage the peripheral surface 53 of the lower collar 22 and will not return to the locked position. However, as soon as the wheel 14 is castered around to a position wherein the mounting sleeve 26 is properly oriented with the lower collar 22 the action of the spring 48 will snap the lock bar 37 into the notch 54 to operatively connect the steering mechanism 19 with the nose wheel 14. Since the landing wheel 14 is normally formed with trail or caster, any taxiing of the aircraft in the forward direction will bring the landing wheel into the neutral or forward position wherein it is aligned with central axis of the aircraft, thereupon enabling the lock bar 37 to snap into the notch 54.

The above disclosed structure provides a simple, low-cost, essentially fool-proof method of providing free swiveling for a landing gear during ground handling of an aircraft. Because the stem 38 and the lock bar 37 move only horizontally the impact of landing and the like will not tend to shake the bolt to an unlocked position. With this mechanism it is impossible to damage the landing gear by forgetting to disconnect the steering during ground handling, and there is no danger of the pilot completing a take-off with a steering system disconnected.

Although the preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

A landing gear comprising a cylinder member adapted to be mounted on an aircraft, a piston member telescoping into said cylinder member axially movable relative thereto, a landing wheel journalled on said piston member, a steerable collar axially fixed and rotatable relative to said piston member, a lock assembly including a lock element mounted on said piston member for horizontal movement relative thereto from a locked position in which it engages said collar and prevents rotation thereof relative to said piston member and an unlocked position in which it disengages said collar and permits relative rotation between said collar and said piston member, a pair of lugs on said piston, a tow bar, aligned bores on said tow bar and lugs adapted to receive a bolt connecting said tow bar to said piston, said lock element projecting between said bores on said lugs when it is in said locked position and being maintained in the unlocked position when said bolt connects said tow bar and piston member, and a spring resiliently urging said lock element towards said locked position.

References Cited in the file of this patent

UNITED STATES PATENTS

| | | |
|---|---|---|
| 2,391,608 | Wood | Dec. 25, 1945 |
| 2,544,278 | Nickell | May 6, 1951 |
| 2,745,612 | Cupp | May 15, 1956 |